United States Patent [19]
Hess et al.

[11] Patent Number: 5,259,415
[45] Date of Patent: Nov. 9, 1993

[54] MAGNETIC VALVE

[75] Inventors: Juergen Hess, Baden-Baden-Steinbach; Claudius Muschelknautz, Lauf, both of Fed. Rep. of Germany

[73] Assignee: Robert Bosch GmbH, Stuttgart, Fed. Rep. of Germany

[21] Appl. No.: 965,224

[22] Filed: Oct. 23, 1992

[30] Foreign Application Priority Data

Dec. 4, 1991 [DE] Fed. Rep. of Germany ....... 4139947

[51] Int. Cl.$^5$ .................... F16K 11/044; F16K 31/06
[52] U.S. Cl. ................... 137/625.65; 137/625.44; 251/65; 251/129.2
[58] Field of Search ............... 251/65, 129.2; 137/625.65, 625.27, 625.44

[56] References Cited

U.S. PATENT DOCUMENTS 4,561,632 12/1985 Hügler ..................... 137/625.44 X
4,574,841 3/1986 Hügler ..................... 137/625.65 X

*Primary Examiner*—Arnold Rosenthal
*Attorney, Agent, or Firm*—Michael J. Striker

[57] ABSTRACT

A magnetic valve has a valve member cooperating with at least one valve opening for closing and releasing the latter, an actuating element provided for the valve member and displaceable between two end positions for the closing and releasing of the valve opening, a permanent magnet arranged in the actuating magnet and magnetizable in direction of displacement of the actuating element for holding the actuating element in the end positions, an electromagnet for producing a magnetic force displacing the actuating element between the positions. The electromagnet has a magnetic core with a yoke and three parallel legs connected by the yoke. The legs include outer legs magnetically connected with end abutments and a central leg extending to the actuating element, and an operating winding is arranged on the central leg, a bending spring has a free end, the actuating element is mounted on the bending spring, and the free end of the bending spring supports the valve member.

13 Claims, 2 Drawing Sheets

MAGNETIC VALVE

BACKGROUND OF THE INVENTION

The present invention relates to a magnetic valve.

More particularly, it relates to a magnetic valve which has a valve member which cooperates with the valve opening for closing and releasing the same, and an actuating element displaceable in a valve chamber for actuating the valve member, a permanent magnet arranged in the actuating member for holding the same in the end positions, and an electromagnet for producing a magnetic force displacing the actuating element between the respective positions.

The magnetic valves of the above mentioned general type are known in the art. One of the magnetic valves of this type, so-called bistable magnetic valve is disclosed in the German reference DE 4,000,071 A1. In this document the actuating element and the valve member are accommodated in a valve piston assembled from the centrally arranged disc-shaped permanent magnet, two soft iron rings abutting against the surfaces of the permanent magnet and having central openings filled with elastomeric filling pieces, and a sleeve-shaped guiding cage which surrounds the permanent magnet and the soft iron rings and holds them non-displaceably. The end abutments are formed by ferromagnetic connecting pieces which are arranged coaxially at both sides of the valve piston at a distance from it. The connecting pieces have central connecting openings with mouths which form in the valve chamber the valve openings of the magnetic valve. The end sides of the connecting pieces which face the valve piston are formed as valve seats which cooperate with the filling pieces in the soft iron rings for closing and releasing the valve openings. The guiding cage projects at one side beyond the soft iron rings so that it slides in each displacement position of the valve piston on the closing pieces which are outwardly provided with the guiding surfaces. The valve piston extends during its displacement movement through a circular opening in the central leg of the magnet core. With the exact coaxial orientation of the connecting pieces, the ring gap between the central leg and the valve pieces can be retained very small.

One of the valve openings controlled by the valve piston is provided for connection with a pressure source and the other valve opening is provided for connection with a pressure sink. The guiding cage further carries a ring collar arranged near the respective cage end and having a valve opening connectable with the pressure sink. This ring collar serves for supporting a pressure spring. The other end of the pressure spring abuts against the connecting piece which has this valve opening and in the abutment position of the valve piston closing this valve opening provides a prestress in the opening direction. The pressure spring is dimensioned so that the prestressing force of the valve piston which is held by the permanent magnet in the abutting or closing position cannot be displaced. This pressure spring serves for increasing the response sensitivity of the magnetic valve when the valve piston must be transferred to its another abutment position. It compensates the forces which is applied by the pressure of the medium flowing in the valve chamber from the pressure source and applied to the valve piston.

SUMMARY OF THE INVENTION

Accordingly, it is an object of the present invention to provide a magnetic valve of the above mentioned general type, which avoids the disadvantages of the prior art.

In keeping with these objects and with others which will become apparent hereinafter, one feature of the present invention resides, briefly stated, in a magnetic valve of the above mentioned type, in which the actuating element is mounted on a bending spring and a free end of the bending spring carries the valve member.

When the magnetic valve is designed in accordance with the present invention as defined above, it has the advantage that due to the structural suspension of the actuating element on the bending spring, a guidance of the actuating element on the sliding surfaces, such as guiding surfaces of the connecting piece in the known magnetic valve, is dispensed with. As a result, on the one hand, no friction losses which require low adjustment forces are produced and, on the other hand, a clamping of the actuating member on the guides is no longer possible. The magnetic valve accessible easier and more robust.

Due to the displacement of the valve member from the alignment of the actuating element and the end abutments on the free ends of the bending spring under the actuating element, the tolerances on the end abutments in direction of the longitudinal extension of the bending spring and on the sealing surfaces of the valve opening can be greater, without causing problems for the narrow tolerance gap between the actuating member and the central leg.

The magnetic valve is easy to manufacture and in accordance with another preferable embodiment of the invention, the bending spring is formed as a spring leaf in a recess in the central leg of the magnet core and is clamped at one end as a pendulum which is freely deflectable with insert magnets in the displacement direction of the actuating element, and the actuating element is received in a throughgoing opening of the spring leaf. The valve member formed as an elastomeric piece is arranged on the free end of the spring leaf which extends outwardly beyond the throughgoing opening. It can be fitted on and vulcanized in a simple manner.

The valve seat which cooperates with at least one closing surface of the elastomer piece for closing or releasing at least one valve opening is injection molded directly on a two-part synthetic plastic housing in accordance with an advantageous embodiment of the present invention. The housing accommodates the electromagnet as well as the abutment elements which form the end abutments and the valve chamber in which the actuating member with the elastomer piece is suspended in an axially displaceable manner. At least one valve opening which is surrounded by the valve seat is formed by a mouth of a connecting opening which ends in the valve chamber.

In accordance with a preferable embodiment of the present invention, in the valve chamber two valve openings which are surrounded by a valve seat an are coaxial with one another are formed. They are located opposite to the respective end surfaces of the elastomer piece. One valve opening is provided for connection through the connecting opening to a pressure source while another valve opening is provided for connection through a connecting opening with a pressure sink. In addition, a passage which leads to a working connection opens into the valve chamber. A bending spring is clamped asymmetrically in the central leg of the magnet core so that in the abutment position of the actuating element in which the elastomer piece closes the valve opening connected with the pressure sink, it has a return force which counteracts the holding force of the permanent magnet and is greater in the opening direction than in the other abutment position. In both abutment positions the return force of the spring leaf is smaller than the counteracting holding force of the permanent magnet. In this manner, an additional pressure spring for compensation of the pressure force of the medium flowing from the pressure sink into the valve chamber and described in connection with the non-magnetic valve, can be dispensed with.

When in accordance with an advantageous embodiment of the invention, the three leg magnet core is assembled of two U-shaped flux guiding sheets, two U-shaped legs associated respectively with one flux guiding sheet extend at a distance parallel to one another and form a central leg of the magnet core for supporting the operating winding. When the spring leaf is arranged between both U-shaped legs of the flux guiding sheet which forms the central leg of the magnet core, it is simple to form in the central leg a recess for receiving the spring leaf. This has also the advantage that the magnetic circuit can be made as simple punch bending part which is manufactured in cost-favorable manner.

For producing a sufficiently great holding force with relatively small permanent magnet in the abutment positions of the actuating element, it is recommended to have a minimum possible air gap in the holding magnet circuit which is closed through the end abutments and the central leg. For this purpose in accordance with a further embodiment of the invention, the support of the actuating element which receives the permanent magnet and the pole pieces is formed as a sleeve which extends through a circular opening in the central leg with a remaining annular gap. The annular gap can be maintained very small, so that also the magnetic losses in the actuating magnet circuit of the electromagnet can be retained very low.

In accordance with an advantageous embodiment of the invention the pole pieces are formed so that in their end regions facing away of the permanent magnets they project over the permanent magnet to the central leg of the magnet core and in the abutment positions of the actuating element each pole piece in the projecting region abuts without a gap against the central leg. Thereby an air gap-free formation of the holding magnetic circuit at the north and south pole of the permanent magnet is obtained and therefore the holding force in the abutment positions of the actuating member is substantially increased. Also the switching condition of the magnetic valve is improved in that a double force engagement at the pole pieces is produced. It simultaneously pushes one pole piece from the associated end abutment and pulls it from the central leg, while the other pole piece is pushed from the central leg and pulled by the associated end abutment, and vice versa.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
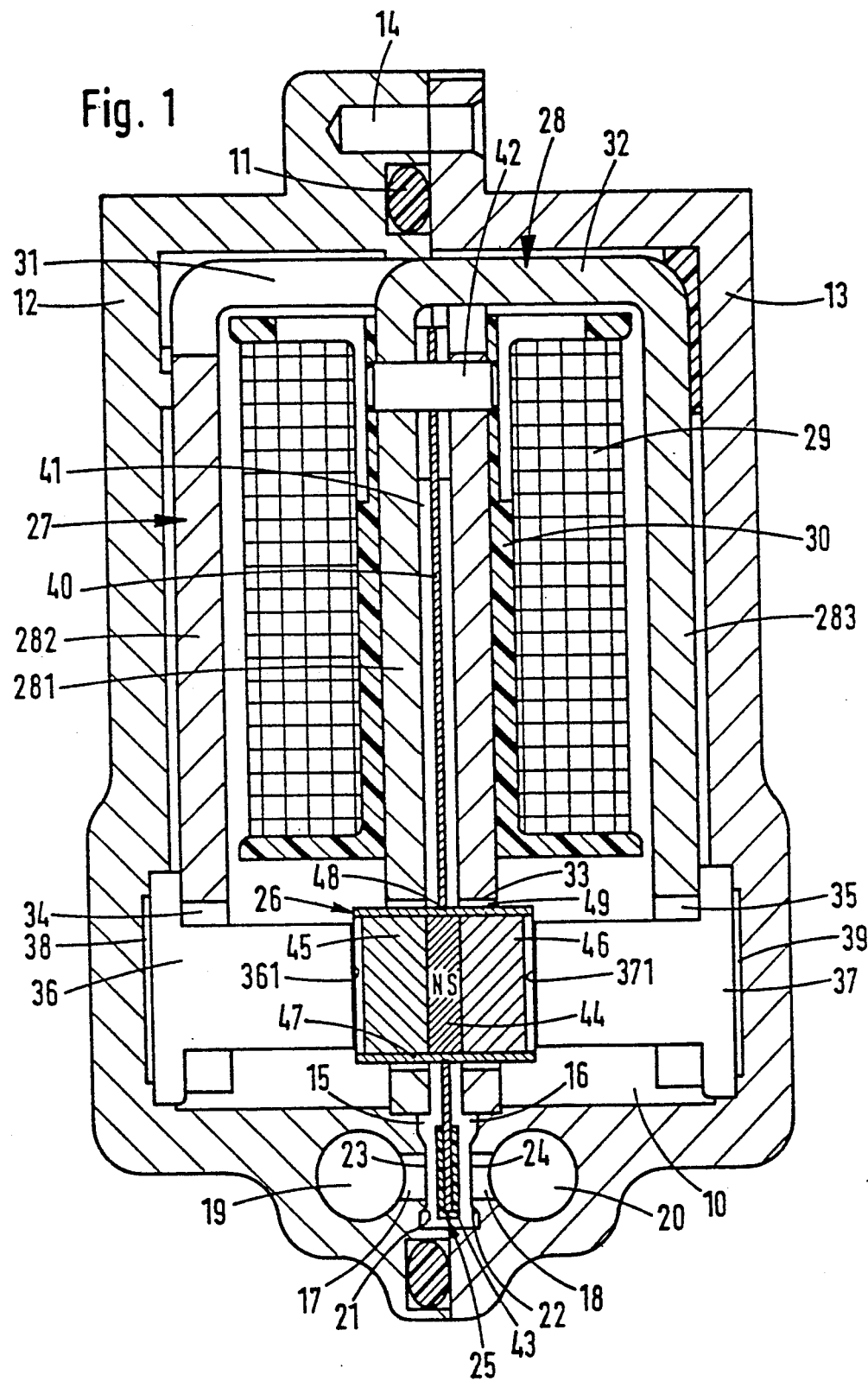
FIG. 1 is a view showing a longitudinal section of a magnetic valve in accordance with the present invention.

A bistable magnetic valve shown in FIG. 1 in a longitudinal section has a valve chamber which is identified with reference numeral 10. The valve chamber is enclosed by two housing parts 12 and 13 which abut against one another in a fluid-tight manner with interposition of a seal 11 and are connected with one another by screws which extend through openings 14 and pretensioned housing parts. In the bottom region the valve chamber 10 is deepened in a bag-like manner by two mirror-symmetrical recesses 15 and 16 provided in the housing parts 12 and 13. Transverse openings 17 and 18 are formed in the base of each opening 15 and 16 and open into transversely extending connecting openings 19 and 20.

The connecting opening 19 is provided for connection of the magnetic valve to a pressure source while the connecting opening 20 is provided for connection of the magnetic valve to a pressure sink. Moreover, a passage which leads to a working connection of the magnetic valve opens into the valve chamber 10 and is not shown in the drawings. The mouths of the transverse openings 17 and 18 in the openings 15 and 16 form respectively openings 23 and 24 which are enclosed by valve seats 21 and 22 formed in the housing parts 12 and 13. A valve member 25 cooperates with the valve seats 21 and 22 for alternating closing and releasing the valve openings 23 and 24. The valve member 25 is arranged coaxially to the oppositely located valve openings 23 and 24 and held turnably movable between them.

The valve member 25 is fixedly connected with an actuating element 26 which in turn is driven by an electromagnet 27. The electromagnet 27 is accommodated in a valve chamber 10 and clamped between the housing parts 12 and 13. In a known manner, it is composed of a magnet core 28 which is substantially E-shaped in a longitudinal cross-section, and an operating winding 29 on a substantially double T-shaped winding support 30 of insulating material. The winding support 30 is fitted on a central leg 281 of the magnet core 28 and extends with its both transverse surfaces parallel to the yoke which connects the legs, to the vicinity of both outer legs 282 and 283 of the magnet core 28. The magnet core 28 is composed of two U-shaped flux guiding plates 31 and 32, and the central leg 281 is formed by two U-shaped legs which are associated with one flux guiding sheets 31, 32 and extend parallel at a distance from one another. The flux guiding sheets 31 and 32 are arranged so that the inner U-shaped leg of the flux guiding plate 31 or 32 is located between both U-shaped legs of the other flux guiding plate 32 or 31. The central leg 21 which is formed by both U-shaped legs is provided near its free end with a circular throughgoing opening 33 for the actuating element 26. The outer legs 282 and 283 are provided at their free ends with coaxial U-shaped recesses 34 and 35. Ferromagnetic inserts 36 and 38 which have a T-shaped cross-section extend with their cylindrical shafts in the recesses 34 and 35. The insert pieces 36 and 37 are arranged coaxial relative to one another and to the actuating element 26 and held with their transverse surfaces in the depressions 38 and 39 in both housing parts 12 and 13 in a form-locking manner.

The outer legs 282, 283 of the magnet core 28 engage the cylindrical shaft of the insert pieces 36, 37 and abut with their outer side in a gap free manner against the transverse flange. The free end surfaces of the shafts of the T-shaped insert pieces 36, 37 engaging in the valve chamber 10 form two end abutments 361, 371 for the actuating member 26. Its special arrangement is selected so that during the abutment of the actuating element 26 against one or another end surface of the insert pieces 36, 37, the valve member 25 sealingly abuts against the valve seat 21 or 22 of the valve opening 23 and 24 and closes the latter.

The actuating element 26 together with the valve member 25 is mounted on a bending spring. The bending spring is formed as a spring leaf 40 and extends in the central leg 281 of the electromagnet 28, in a recess 41 formed by both U-shaped legs of the flux guiding sheets 31, 32 located at a distance from one another. The spring leaf 40 is clamped at one side in a pendulum-like manner by a pin 42 extending through the U-shaped leg of the flux guiding sheets 31, 32, so that the actuating element 26 can freely swing between end abutments 361 and 371 formed by the insertion pieces 36 and 37. An elastomer piece 43 is fitted on the free end of the spring leaf 40 and form a valve member 25. The elastomer piece 43 can be vulcanized on the free end.

The actuating element 26 is composed of a disc-shaped permanent magnet 44 which is magnetized in the displacement direction of the actuating element 26, and two pole pieces 45 and 46 connected with its at both sides and composed of soft iron. They are surrounded by a sleeve 47 and fixed by it on one another in an air gap free manner. The sleeve 47 extends in a passage 48 of the spring leaf 40 and non-displaceably held in it by edging or welding so as to provide a narrow tolerance ring gap 49 in the throughgoing opening 33 of the central leg 281 of the magnet core 28.

In accordance with a preferable embodiment of the magnetic valve, both flux guiding sheets 31 and 32 which together form the magnet core 28 are magnetically insulated from one another. The magnetic valve in accordance with this embodiment operates in the following manner.

Initially the magnetic valve is in a position in which the actuating element 26 with the pole piece 45 abut against the end abutment 361 formed on the ferromagnetic insert piece 36 and thereby the elastomer piece 43 which operates as the valve member 25 holds the valve opening 23 closed. The permanent magnet 44 in this position of the actuating element 26 produces a magnetic flux which extends from the north pole N of the permanent magnet 44 to the insert piece 36 and to the outer leg 282 of the magnet core 28 and from there through the left U-shaped leg of the central leg 281 in FIG. 1 back to its south pole S of the permanent magnet 44. A further magnetic flux is formed from the north pole end of the permanent magnet 44 through the left leg of the central leg 281 in FIG. 1, the outer leg 283 and the ferromagnetic insert piece 37 to the south pole S of the permanent magnet 44. Since the gapless distance of the pole piece 45 from the insert piece 36 is substantially smaller than the pole piece 46 of the insert piece 37, the flux density and thereby the attraction force between the insert piece 36 and the pole piece 45 is substantially greater than between the insert piece 37 and the pole piece 47. The actuating element 26 is thereby held in the assumed end position, in which the valve opening 23 is closed and the valve opening 24 is released. Thereby no fluid can escape from the valve chamber 10 through the openings 18, 20.

For transferring the actuating element to the other end position, the electromagnet 27 is energized with such a polarity that a magnetic flux is produced which counteracts the magnetic flux of the permanent magnet 44 between the pole piece 45 and the insert piece 36 and weakens the same. Simultaneously this magnetic flux which is produced by the electromagnet 27 reinforces the permanent magnet flux extending between the insert piece 37 and the pole piece 46. Since now the field density and the attraction force between the insert piece 37 and the pole piece 46 is greater, the actuating element 26 moves in FIG. 1 to the right and the valve member 25 abuts against the valve seat 22. With the released valve opening 23, the fluid can discharge through the openings 19, 17 into the valve chamber 10. The electromagnet 27 can be again switched off, since the magnetic flux of the permanent magnet 44 through the pole piece 46 and the insert piece 37 is sufficient to hold the actuating element 26 against the end abutment 371.

For moving the actuating element 26 back to its initial position, the electromagnet 27 is again energized with the opposite polarity over a short time. The magnetic flux produced in this manner weakens the magnetic flux between the pole piece 46 and the insert piece 37 and reinforces the magnetic flux between the pole piece 45 and the insert piece 36. The actuating element 26 moves again further to its left abutment position shown in FIG. 1. The deviation of the actuating element 26 is caused not only by the attraction forces produced by the joint flux of the permanent magnet 44 and the electromagnet 26, but also additionally by the expelling forces produced due to the alternating action between the flux of the permanent magnet 44 and the electromagnet 27.

The communication of the connecting opening 19 with the pressure source has the advantage that the spring leaf 40 is clamped asymmetrically in the central leg 281 of the magnet core 28 so that in the abutment position of the actuating element 26 against the end abutment 371 in which the valve opening 24 communicating with the pressure sink is closed by the valve member 25, the spring leaf has a greater return force in the opening direction of the valve which counteracts the holding force of the permanent magnet 44, than in the other abutment position. Thereby the response sensitivity of the magnetic valve during switching of the valve from the valve position communicating with the pressure sink to the valve position communicating with the pressure source is improved, since due to the pretensioning force of the spring leaf 40 the force which is applied to the valve member 25 by the medium flowing in the valve chamber 10 is compensated. The return force of the spring leaf 40 in both abutment positions of the actuating element 26 is selected so that in each case it is smaller than the counteracting holding force of the permanent magnet 44.

Figure 2:
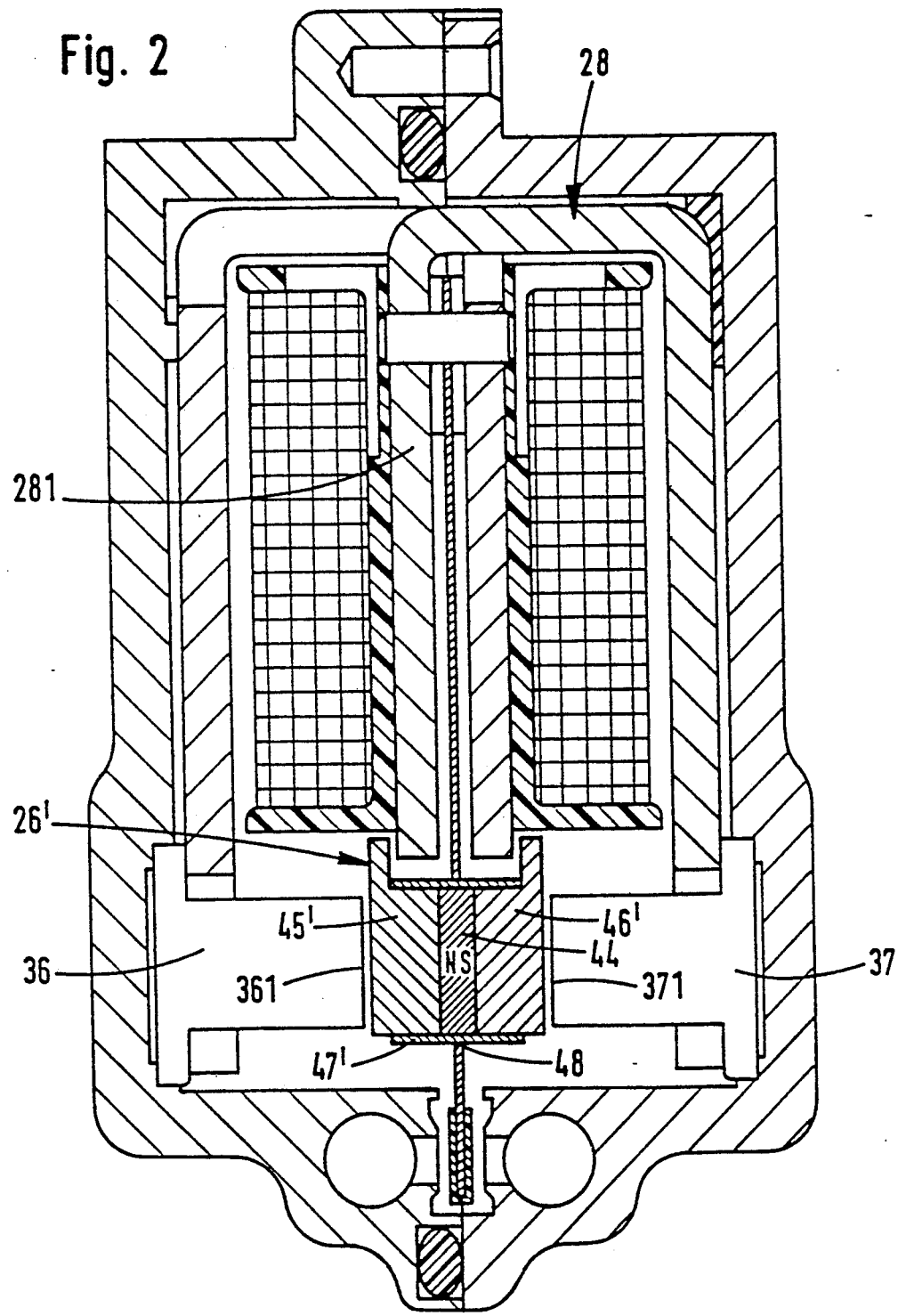
FIG. 2 is a view showing a longitudinal section of a magnetic valve in accordance with a modified embodiment of the present invention.

The magnetic valve in accordance with a further embodiment which is shown in the longitudinal section in FIG. 2 corresponds to the above described magnetic valve and is different from the latter only by the modified actuating element 26'. The central 281 of the magnet core 28 is shortened and extend only to the upper edge of the actuating element 26'. Both pole pieces 45' and 46' project in the end region facing away from the permanent magnet 44, over the permanent magnet 44 to the central leg 281 so far that in the abutment positions of the actuating element 26' each pole piece 45' or 46' abuts in the projecting region without a gap against the central leg 281. Thereby, in contrast to the magnet valve of FIG. 1, the magnetic circuit of the permanent magnet 44 in each abutment position is gapless, since the magnetic circuit no longer extends through the ring gap 49 of FIG. 1 but instead gapless through the part of the pole piece 46' or 45' projecting over the permanent magnet 44. As a result, the holding force of the permanent magnet 44 is substantially increased, or vice versa the permanent magnet 44 with the same holding force can be made smaller.

Moreover, the switching condition of the magnetic valve is improved since a double force engagement of the pole pieces 45', 46' is obtained in that, one pole piece 45 is pushed from the end abutment 361 and pulled by the central leg 281, while the other pole piece 46 is pulled by the end abutment 371 and pushed by the central leg 281, and vice versa. Both pole pieces 45' and 46' with the permanent magnet 44 located therebetween are also non-displaceably mounted on a support 47' which holds the spring leaf 40 in a throughgoing opening 48. The support 47' can be a sleeve formed so that the pole pieces 45' and 46' extend out of it at both ends and pulled out over the central leg 281 of the magnet core 28.

It will be understood that each of the elements described above, or two or more together, may also find a useful application in other types of constructions differing from the types described above.

While the invention has been illustrated and described as embodied in a magnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A magnetic valve, comprising a valve member cooperating with at least one valve opening for closing and releasing the latter; an actuating element provided for said valve member and displaceable between two end positions for the closing and releasing of said valve opening; a permanent magnet arranged in said actuating magnet and magnetizable in direction of displacement of said actuating element for holding said actuating element in said end positions; an electromagnet for producing a magnetic force displacing said actuating element between said positions, said electromagnet having a magnetic core with a yoke and three parallel legs connected by said yoke, said legs including outer legs magnetically connected with end abutments and a central leg extending to said actuating element, and an operating winding arranged on said central leg; and a bending spring having a free end, said actuating element being mounted on said bending spring, and said free end of said bending spring supporting said valve member, said bending spring being formed as a spring leaf, said central leg of said magnet core having a recess, said spring leaf extending through said recess of said central leg of said magnet core and is clamped at one side in a pendulum-like manner deflectably in direction of displacement of said actuating element within certain limits, said actuating element having a throughgoing opening in which said spring leaf is received in a non-displaceable fashion.

2. A magnetic valve as defined in claim 1, wherein said actuating element has a support which is fixedly connected with said spring sheet, said permanent magnet having on both sides pole pieces composed of ferromagnetic material and being non-displaceably held together with said pole pieces in said support.

3. A magnetic valve as defined in claim 1, wherein said valve member is formed as an elastomer piece arranged on an end of said spring leaf, at least one valve opening being formed as a mouth of an opening; and further comprising a valve seat which surrounds said mouth; and a housing which surrounds said valve chamber, receives said electromagnet and has said opening with said mouth.

4. A magnetic valve as defined in claim 3, wherein said elastomer piece is fitted on said spring leaf.

5. A magnetic valve as defined in claim 3, wherein said elastomer piece is vulcanized on said spring leaf.

6. A magnetic valve as defined in claim 3, wherein said valve chamber is provided at both sides of said elastomer piece with valve openings connected respectively with a pressure source and a pressure sink and alternatingly closeable and releasable by said elastomer piece in said positions of said actuating element.

7. A magnetic valve as defined in claim 6; and further comprising a passage which leads to a working connection and opens into said valve chamber.

8. A magnetic valve as defined in claim 3, wherein said spring sheet is clamped asymmetrically in said central leg of said magnet core so that in one abutment position of said actuating element in which said elastomer piece closes one of said valve openings which is connected with the pressure sink, said spring leaf has a greater return force in an opening direction which counteracts a holding force of said permanent magnet than in the other of the abutment positions, and the return force of said spring leaf in both abutment positions of said actuating element is smaller than the counteracting holding force of said permanent magnet.

9. A magnetic valve as defined in claim 1, wherein said three-leg magnet core is composed of two U-shaped flux guiding sheets, two of said U-shaped legs associated with a respective of said flux guiding sheets extend at a distance parallel relative to one another and form the central leg of said magnet core which supports said operating winding, said spring leaf being located between said two U-shaped legs of said flux guiding sheets.

10. A magnetic valve as defined in claim 9, wherein said U-shaped flux guiding sheets are magnetically isolated from one another.

11. A magnetic valve as defined in claim 1; and further comprising end abutments which are formed by ferromagnetic insert pieces with a substantially T-shaped cross-section and a shaft which is coaxial to said actuating element, said outer legs of said magnet core having cutouts through which said shaft extends, said insert pieces having transverse flanges abutting against said outer legs of said magnet core.

12. A magnetic valve as defined in claim 2, wherein said support which receives said permanent magnet of said pole pieces is formed as a sleeve, said central leg of said magnet core having a circular opening through which said sleeve extends with leaving an annular gap.

13. A magnetic valve as defined in claim 2, wherein said pole pieces are formed so that in their end regions which face away from said permanent magnet they extend over said permanent magnet toward said central leg of said magnet core, and in abutment positions of said actuating element a respective one of said pole pieces abutting in a projecting region against said central leg without a gap.

* * * * *